(12) United States Patent
Jones et al.

(10) Patent No.: US 10,911,508 B2
(45) Date of Patent: Feb. 2, 2021

(54) ADAPTIVE BITRATE STREAMING OF LIVE CONTENT

(71) Applicant: Telefonaktiebolaget LM Ericsson (publ), Stockholm (SE)

(72) Inventors: Anthony Richard Jones, Southampton (GB); Chris Phillips, Hartwell, GA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/324,465

(22) PCT Filed: Jul. 26, 2017

(86) PCT No.: PCT/EP2017/068868
§ 371 (c)(1),
(2) Date: Feb. 8, 2019

(87) PCT Pub. No.: WO2018/028986
PCT Pub. Date: Feb. 15, 2018

(65) Prior Publication Data
US 2019/0222622 A1      Jul. 18, 2019

Related U.S. Application Data

(60) Provisional application No. 62/373,576, filed on Aug. 11, 2016.

(51) Int. Cl.
G06F 15/16 (2006.01)
H04L 29/06 (2006.01)
H04L 1/00 (2006.01)

(52) U.S. Cl.
CPC .......... H04L 65/601 (2013.01); H04L 1/0018 (2013.01); H04L 65/1059 (2013.01);
(Continued)

(58) Field of Classification Search
CPC . H04L 65/601; H04L 1/0018; H04L 65/1059; H04L 65/4084; H04L 65/4092;
(Continued)

(56) References Cited

U.S. PATENT DOCUMENTS 8,234,350 B1 * 7/2012 Gu ..................... H04N 21/8458
709/217
8,380,786 B2   2/2013 Hoffert et al.
(Continued)

FOREIGN PATENT DOCUMENTS

WO   2012021543 A1   2/2012
WO   2014152047 A2   9/2014

OTHER PUBLICATIONS

Eyevinn Technologies. "Internet Video Streaming—ABR part 2". Mar. 14, 2018. pp. 1-8. (Year: 2018).*
(Continued)

*Primary Examiner* — Imad Hussain
(74) *Attorney, Agent, or Firm* — Murphy, Bilak & Homiller, PLLC

(57) ABSTRACT

There is provided a client device arranged to receive a live adaptive bitrate stream, the client device further arranged to: request a manifest file; and request a manifest update hint. The client device further arranged to receive a manifest update hint, the manifest update hint including an indication of when the manifest will be updated; and request an updated manifest file at a time indicated by the manifest update hint.

8 Claims, 8 Drawing Sheets

(52) U.S. Cl.
CPC ...... *H04L 65/4084* (2013.01); *H04L 65/4092* (2013.01); *H04L 65/607* (2013.01); *H04L 65/608* (2013.01); *H04L 67/42* (2013.01); *H04L 1/0014* (2013.01)

(58) Field of Classification Search
CPC ..... H04L 65/607; H04L 65/608; H04L 67/42; H04L 1/0014
USPC ........................................................ 709/219
See application file for complete search history.

(56) References Cited

U.S. PATENT DOCUMENTS

| | | | |
|---|---|---|---|
| 8,949,307 B2 | 2/2015 | Oplinger et al. | |
| 9,654,528 B1* | 5/2017 | Cho | H04N 21/23406 |
| 10,123,087 B1* | 11/2018 | Killick | H04N 21/2343 |
| 10,277,928 B1* | 4/2019 | Joliveau | H04N 21/26258 |
| 10,277,929 B1* | 4/2019 | McLeod | H04N 21/2187 |
| 10,313,721 B1* | 6/2019 | McLeod | H04N 21/2387 |
| 2011/0307581 A1 | 12/2011 | Furbeck et al. | |
| 2012/0042050 A1 | 2/2012 | Chen et al. | |
| 2012/0110120 A1 | 5/2012 | Willig et al. | |
| 2012/0207088 A1* | 8/2012 | Liu | H04L 65/608 370/328 |
| 2012/0254456 A1* | 10/2012 | Visharam | H04N 21/2343 709/231 |
| 2013/0311670 A1* | 11/2013 | Tarbox | H04N 21/6125 709/231 |
| 2013/0312046 A1* | 11/2013 | Robertson | H04N 21/472 725/93 |
| 2014/0164547 A1 | 6/2014 | Fullagar et al. | |
| 2014/0201796 A1 | 7/2014 | Moon et al. | |
| 2014/0372624 A1 | 12/2014 | Wang et al. | |
| 2014/0379871 A1* | 12/2014 | Van Brandenburg | H04L 65/1069 709/219 |
| 2015/0067722 A1* | 3/2015 | Bjordammen | G06Q 30/0253 725/32 |
| 2015/0088965 A1* | 3/2015 | Pakulski | H04L 65/4092 709/203 |
| 2015/0180924 A1* | 6/2015 | O'Callaghan | H04L 43/0829 709/219 |
| 2015/0256583 A1* | 9/2015 | Rosenzweig | H04N 21/8456 709/219 |
| 2015/0288730 A1* | 10/2015 | Friedrich | H04L 65/607 709/219 |
| 2015/0334153 A1* | 11/2015 | Koster | H04L 67/32 709/219 |
| 2016/0112484 A1* | 4/2016 | Liu | H04L 65/4092 709/231 |
| 2016/0127440 A1* | 5/2016 | Gordon | H04N 21/23439 709/219 |
| 2016/0269459 A1* | 9/2016 | Harden | H04L 65/4076 |
| 2016/0294898 A1* | 10/2016 | Wheelock | H04L 65/602 |
| 2016/0360265 A1* | 12/2016 | Flick | H04N 21/4334 |
| 2016/0366202 A1* | 12/2016 | Phillips | H04L 65/602 |
| 2017/0123713 A1* | 5/2017 | Fisher | G06F 3/067 |
| 2017/0272485 A1* | 9/2017 | Gordon | H04L 65/601 |
| 2017/0289639 A1* | 10/2017 | Reisner | H04N 21/812 |
| 2017/0310752 A1 | 10/2017 | Knothe | |
| 2017/0310753 A1 | 10/2017 | Knothe et al. | |
| 2017/0353516 A1* | 12/2017 | Gordon | H04L 67/10 |
| 2017/0359628 A1* | 12/2017 | Sachdev | H04N 21/812 |
| 2017/0374116 A1 | 12/2017 | Phillips et al. | |
| 2017/0374121 A1 | 12/2017 | Phillips et al. | |
| 2018/0020246 A1* | 1/2018 | Harrison | H04L 65/605 |
| 2018/0026733 A1 | 1/2018 | Yang et al. | |
| 2018/0115796 A1 | 4/2018 | Yang et al. | |
| 2018/0367592 A1 | 12/2018 | Thomas et al. | |
| 2019/0036986 A1 | 1/2019 | Sathyanarayana et al. | |
| 2019/0222622 A1 | 7/2019 | Jones et al. | |
| 2019/0222879 A1* | 7/2019 | Jones | H04L 65/4084 |
| 2019/0327505 A1 | 10/2019 | Schwimmer et al. | |
| 2019/0342356 A1 | 11/2019 | Thomas et al. | |
| 2019/0394538 A1 | 12/2019 | Caulfield et al. | |
| 2020/0053430 A1* | 2/2020 | Burke | H04N 21/4334 |

OTHER PUBLICATIONS

Huysegems, Rafael, et al., "HTTP/2-Based Methods to Improve the Live Experience of Adaptive Streaming", Multimedia, ACM, 2 Penn Plaza, Suite 701, New York, NY 10121-0701 USA, Oct. 13, 2015, pp. 541-550.

* cited by examiner

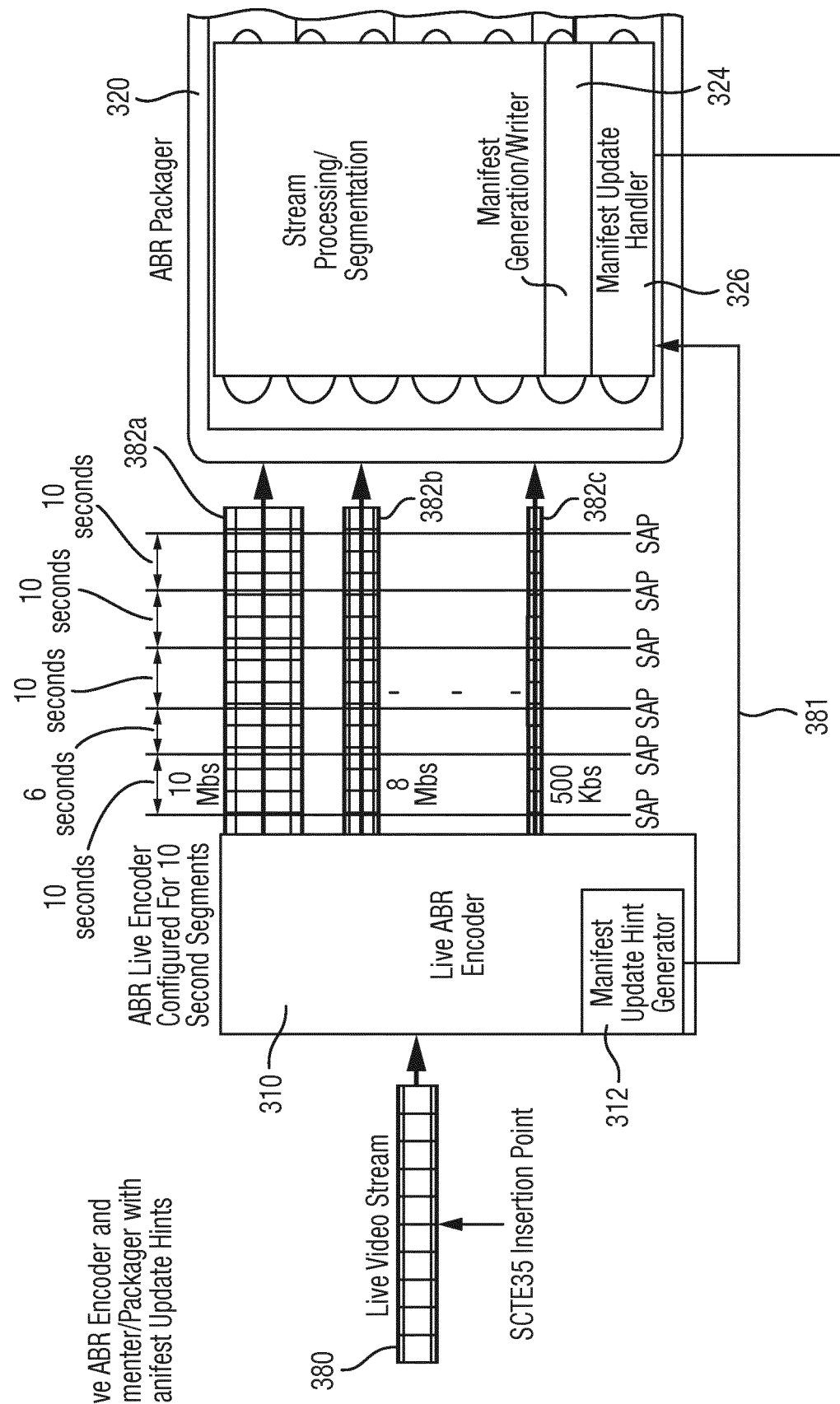

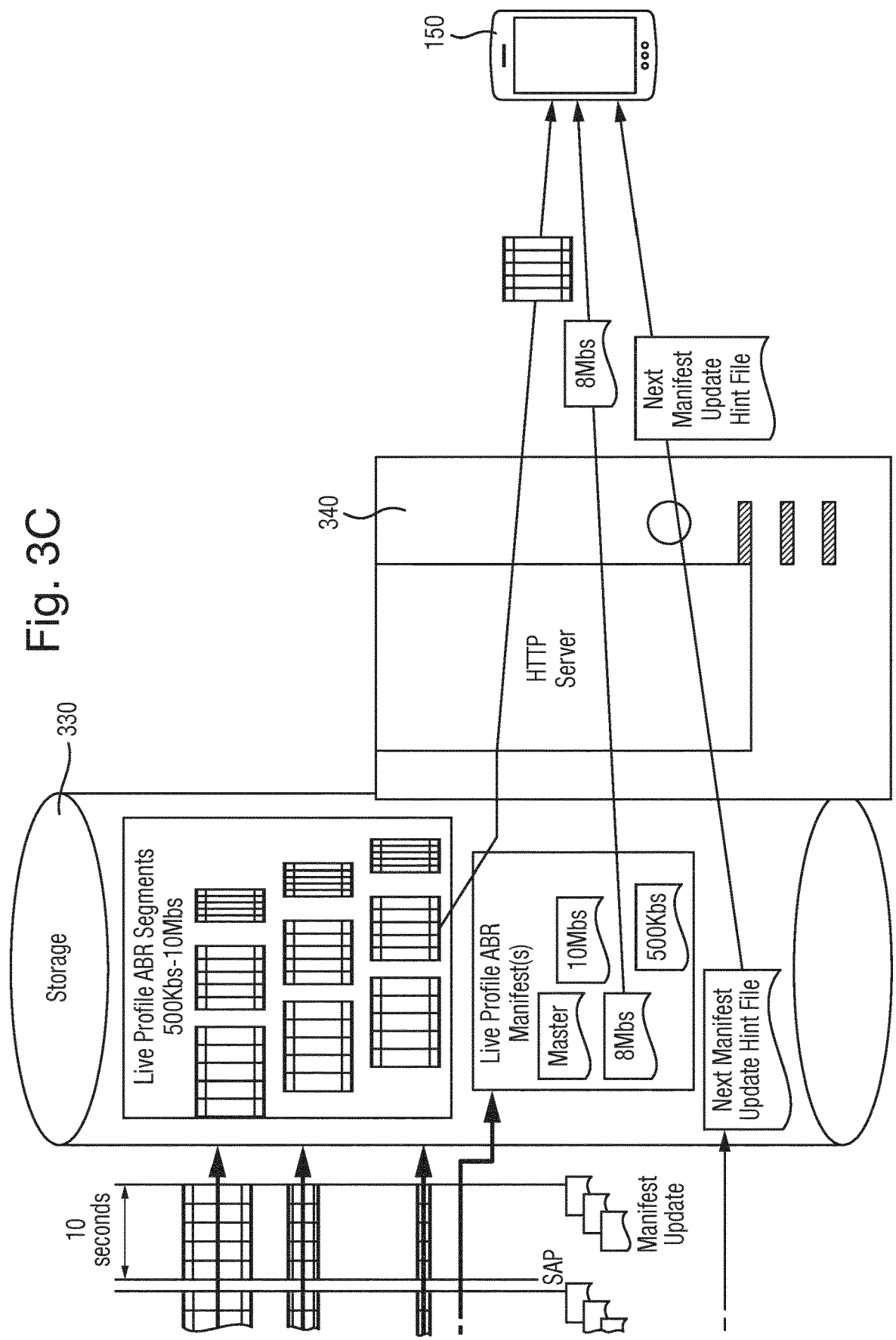

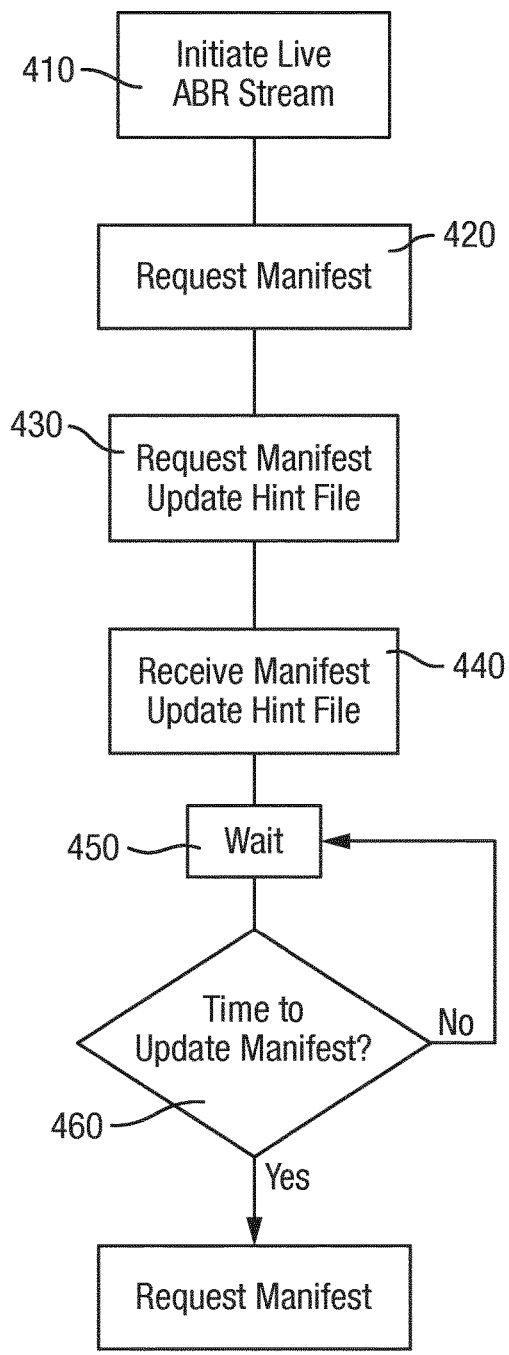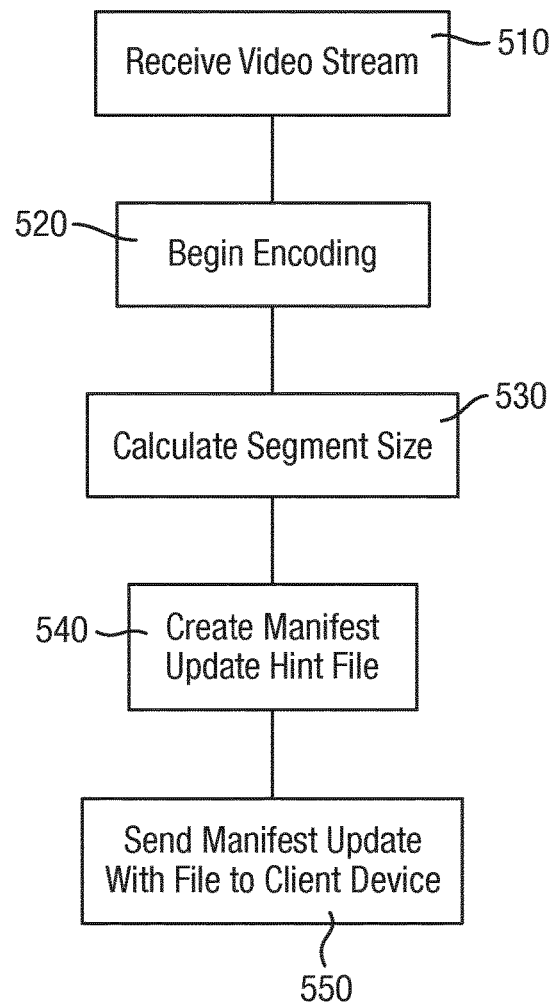

ADAPTIVE BITRATE STREAMING OF LIVE CONTENT

TECHNICAL FIELD

The present application relates to a client device, a method in a client device, a server, a method in a server, an encoder, a method of operating an encoder, a packager, a method of operating a packager, an apparatus for receiving a live adaptive bitrate stream, an apparatus for delivering a live adaptive bitrate stream, and a computer-readable medium.

BACKGROUND

Adaptive bitrate (ABR) streaming has become an important technology for delivering video content over an internet connection. This technology allows for a variation in bandwidth which is typical for a home internet connection. This variation may be due to local contention with other devices and users in the home using the same modem connection for other purposes. A further cause for the variation in available bandwidth is local loop contention where the bandwidth between a plurality of modems in a neighborhood must be shared between a respective plurality of homes.

ABR streaming allows for a variation in bandwidth by measuring the available bandwidth between a streaming device and a server that is sending the streamed video content, and providing the video stream at a bit rate that maximizes the use of the available bandwidth. To achieve this, a server that uses ABR will make the streamed video available in a series of segments, with each segment available in multiple versions, each version encoded at a different bit rate. The ABR streaming client in the streaming device then selects the appropriate segments. The available bit rates are normally fixed.

To allow the ABR streaming client to identify and retrieve appropriate segments of the ABR stream, the server makes a manifest file available to ABR streaming clients. The manifest file lists the segments of the video stream that the server has available for download. A streaming client must first download the manifest file before it can identify which segments to download. The streaming client then requests the appropriate segments and once it receives these it can begin decoding and presenting the content.

Adaptive Bit Rate (ABR) streaming using HTTP Adaptive Streaming (HAS) is increasingly used as a format for live operation. That is, delivery of live video content. Live content may be defined as 'not pre-recorded'. Live content can be considered to be content that is generated and substantially immediately distributed to a client device. HTTP Adaptive Streaming was developed originally with on-demand content in mind, where all the segments are known before streaming begins. This means that all manifests, which describe the segments of a piece of content, are available for a client to download when streaming of that piece of content begins. When a client requests a manifest related to on-demand content, that manifest will be available for that client.

Fundamentally, when ABR streaming is applied to live content, segments are generated only shortly before the client receives them. As such, manifest files must be created as the segments related to the live content are created. If a client requests an updated manifest file before it has been created, it will not receive the file, and will have to re-request it a short time later. However, the client has no way of knowing when the updated manifest file will be available.

For example, in live operation, HAS manifest files are updated each time a new complete segment of media data is available. The time interval between new segments becoming available is unlikely to be constant as it will depend on the content and encoding complexity.

To find an updated manifest the client polls the server to download the server's current manifest. If a poll comes in immediately before the manifest is updated, so the poll just misses the update, then the client will have to wait until the next poll to receive the new manifest. This results in a significant and variable latency between the availability of new media segments and when the client is aware of them. This latency can be up to a complete poll interval (typically several seconds). This in turn leads to more difficult buffering and in the presence of congestion or limited bandwidth can lead to client playback stalling or excessively changing bit rates. When the segment sizes are widely variable (for example due to advertising), the impairments are even more significant.

More frequent polling by clients would reduce any time delay between a manifest being made available and it being downloaded by a client, but this would result in increased signaling overhead which would be particularly problematic for streaming severs having a large number of concurrent users.

The updated manifest will likely include segments that were listed on the previous manifest, hence it is aptly referred to as an update. However, in practice this is a new file, and so the updated manifest can be referred to as a new manifest file, or a new manifest. Herein it will be referred to as an updated manifest.

SUMMARY

There is provided a client device arranged to receive a live adaptive bitrate stream, the client device further arranged to: request a manifest file; and request a manifest update hint. The client device further arranged to receive a manifest update hint, the manifest update hint including an indication of when the manifest will be updated; and request an updated manifest file at a time indicated by the manifest update hint.

The manifest update hint indicates to the client device when it can expect a manifest update to occur. The client device uses this hint to time when it requests an updated manifest file. Operating in this way, the client device is less likely to request a manifest file prematurely; such requests are unnecessary signaling overhead. Furthermore, the client device will consistently download an updated manifest file promptly after it is made available, allowing for better buffering and smoother playback of live content received via the streaming service.

The time indicated by the manifest update hint may be a time interval or specific time mentioned in the manifest update hint, plus a delay. The delay may be selected by the client device.

There may be a systematic delay between the new manifest being created by the server from which the client device receives the live adaptive bitrate stream and it being available for download by the client device. Such a systematic delay may arise due to a shorter segment appearing in the stream. A splice point may occur in the content stream at a point requiring a shorter than usual segment. For example: consider an encoder configured to generate 10 second segments; a splice point notice is received resulting in the encoder generating a shorter segment, such as 4 seconds. The client has been polling at appropriately timed 10 second intervals. The shorter segment means that now the polling has an offset from both the segment generation and when the updated manifest is created.

The manifest update hint described herein allows the client to keep in sync with the segmenter even when segment lengths change.

A splice point may be indicated by an SCTE 35 message. ANSI/SCTE 35 2013 is a joint ANSI/Society of Cable and Telecommunications Engineers standard that describes the inline insertion of cue tones in mpeg transport streams. This is used in broadcasting to insert a local advert or news segment into a nationally broadcast stream.

The live adaptive bitrate stream contains live content. Live content is content that is received at the streaming system shortly before being sent to clients. A delay may occur, resulting from the time taken to process incoming data into a form ready for live adaptive bitrate streaming. The live adaptive bitrate stream may comprise video content.

The manifest update hint may be contained within the manifest file. In such an arrangement, the client device is arranged to receive a live adaptive bitrate stream, the client device further arranged to: request a manifest file; receive a manifest update hint, the manifest update hint including an indication of when the manifest will be updated; and request an updated manifest file at a time indicated by the manifest update hint.

There is provided a method in a client device arranged to receive a live adaptive bitrate stream, the method comprising: requesting a manifest file; and requesting a manifest update hint. The method further comprises receiving a manifest update hint, the manifest update hint including an indication of when the manifest will be updated; and requesting an updated manifest file at a time indicated by the manifest update hint.

The manifest update hint indicates to the client device when it can expect a manifest update to occur. The client device uses this hint to schedule when it requests an updated manifest file. Operating in this way, the client device is less likely to request a manifest file prematurely; such premature requests are unnecessary signaling overhead. Furthermore, the client device will consistently download an updated manifest file promptly after it is made available, allowing for better buffering and smoother playback of live content received via the streaming service.

The time indicated by the manifest update hint may be a time interval or specific time mentioned in the manifest update hint, plus a delay. The method may further comprise selecting the delay.

There may be a systematic delay between the new manifest being created by the server from which the client device receives the live adaptive bitrate stream and it being available for download by the client device.

There is provided a server arranged to deliver a live adaptive bitrate stream, the server arranged to: receive a video stream and generate adaptive bitrate segments for delivery to at least one client device; and calculate the size of a segment being generated before the segment is completed. The server is further arranged to create a manifest update hint file on the basis of the calculated size of the next segment; and send the manifest update hint file in response to a request for such from a client device.

A server that is encoding live content for delivery by adaptive bitrate streaming will determine the size of a segment early on in the encoding of such a segment. The length of the segment determines when it will be ready for download by a client device, and accordingly when the manifest file will be updated to reflect that the segment is ready for download. Accordingly, the server can generate a manifest update hint file in advance of the new manifest file being available, the manifest update hint file giving a useful indication to client devices of when the manifest file will be updated.

The server may be arranged to: receive a request for a manifest file from the client device; and send the current manifest file to the client device.

Subsequent to distributing the manifest update hint file, the server will receive a request for the updated manifest file, that request may be timed by the client device to arrive at the server at a time soon after the manifest file has been updated, that time determined from the indication given in the manifest update hint file. In response to such a request, the server sends the currently available manifest file to the client device.

There is provided a method of operating a server, the arranged to deliver a live adaptive bitrate stream, the method comprising: receiving a video stream and generate adaptive bitrate segments for delivery to at least one client device; and calculating the size of a segment being generated before the segment is completed. The method further comprising: creating a manifest update hint file on the basis of the calculated size of the next segment; and sending the manifest update hint file in response to a request for such from a client device.

A server that is encoding live content for delivery by adaptive bitrate streaming will determine the size of a segment early on in the encoding of such a segment. The length of the segment determines when it will be ready for download by a client device, and accordingly when the manifest file will be updated to reflect that the segment is ready for download. The server can generate a manifest update hint file in advance of the new manifest file being available, the manifest update hint file giving a useful indication to client devices of when the manifest file will be updated.

The method may further comprise: receiving a request for a manifest file from the client device; and sending the current manifest file to the client device.

Subsequent to distributing the manifest update hint file, the server will receive a request for the updated manifest file, that request may be timed by the client device to arrive at the server at a time soon after the manifest file has been updated, that time determined from the indication given in the manifest update hint file. In response to such a request, the server sends the currently available manifest file to the client device.

There is provided an encoder arranged to: receive a video stream and generate adaptive bitrate segments for delivery to at least one client; and output the size of a segment being generated once this is determined and before the segment is completed.

A server arranged to deliver a live adaptive bitrate stream may comprise an encoder and a packager. The encoder is arranged to encode the incoming content stream. Due to buffering inside of the encoder, the encoder has knowledge of the segment size before the segment has been generated. Thus the encoder can issue a notification of how large the next segment will be before that segment is generated. That indication is used to generate a manifest update hint file to indicate to client devices when the manifest file will be updated.

There is provided a method of operating an encoder, the method comprising: receiving a video stream and generate adaptive bitrate segments for delivery to at least one client;

and outputting the size of a segment being generated once this is determined and before the segment is completed.

There is provided a packager arranged to: receive adaptive bitrate segments from an adaptive bitrate encoder and to package these for delivery; receive an indication of the size of the next segment from the adaptive bitrate encoder; and create a manifest update hint file on the basis of the size of the next segment.

A server arranged to deliver a live adaptive bitrate stream may comprise an encoder and a packager. The packager is responsible for creating downloadable segments from the output of the encoder and for updating the manifest file which lists the available segments. The packager will update the next manifest update time in the Next Manifest Update Hint File in response to the indication of the size of the next segment, where that indication is received from the encoder. The packager may be an adaptive bitrate packager. The size of the next segment is received at the packager before that next segment.

There is further provided a method of operating a packager, the method comprising: receiving an adaptive bitrate segments from an adaptive bitrate encoder and to package these for delivery; receiving an indication of the size of the next segment from the adaptive bitrate encoder; and creating a manifest update hint file on the basis of the size of the next segment. The size of the next segment is received at the packager before that next segment.

There is further provided an apparatus for receiving a live adaptive bitrate stream comprising a processor and a memory, said memory containing instructions executable by said processor whereby said apparatus is operative to: request a manifest file; and request a manifest update hint. The apparatus is further operative to receive a manifest update hint, the manifest update hint including an indication of when the manifest will be updated; and request an updated manifest file at a time indicated by the manifest update hint.

There is further provided an apparatus for delivering a live adaptive bitrate stream comprising a processor and a memory, said memory containing instructions executable by said processor whereby said apparatus is operative to: receive a video stream and generate adaptive bitrate segments for delivery to at least one client device; and calculate the size of a segment being generated before the segment is completed. The apparatus is further operative to create a manifest update hint file on the basis of the size of the next segment; and send the manifest update hint file in response to a request for such from a client device.

There is further provided an apparatus for receiving a live adaptive bitrate stream comprising a processor and a memory, said memory containing instructions executable by said processor whereby said apparatus comprising: a module for requesting a manifest file; and a module for requesting a manifest update hint. The apparatus further comprises a module for receiving a manifest update hint, the manifest update hint including an indication of when the manifest will be updated; and a module for requesting an updated manifest file at a time indicated by the manifest update hint.

The time indicated by the manifest update hint may be a time interval or specific time mentioned in the manifest update hint, plus a delay. The delay may be selected by the client device. The live adaptive bitrate stream contains live content.

There is further provided an apparatus for delivering a live adaptive bitrate stream comprising a processor and a memory, said memory containing instructions executable by said processor whereby said apparatus comprising: a module for receiving a video stream and generate adaptive bitrate segments for delivery to at least one client device; and a module for calculating the size of a segment being generated before the segment is completed. The apparatus further comprises a module for creating a manifest update hint file on the basis of the size of the next segment; and a module for sending the manifest update hint file in response to a request for such from a client device.

There is further provided a computer-readable medium, carrying instructions, which, when executed by computer logic, causes said computer logic to carry out any of the methods defined herein.

BRIEF DESCRIPTION OF THE DRAWINGS

A method and apparatus for improved adaptive bitrate streaming of live content will now be described, by way of example only, with reference to the accompanying drawings, in which:

FIG. 4 illustrates a method in a client device arranged to receive a live adaptive bitrate stream;

FIG. 5 illustrates a method of operating a server;

DETAILED DESCRIPTION

Figure 1:
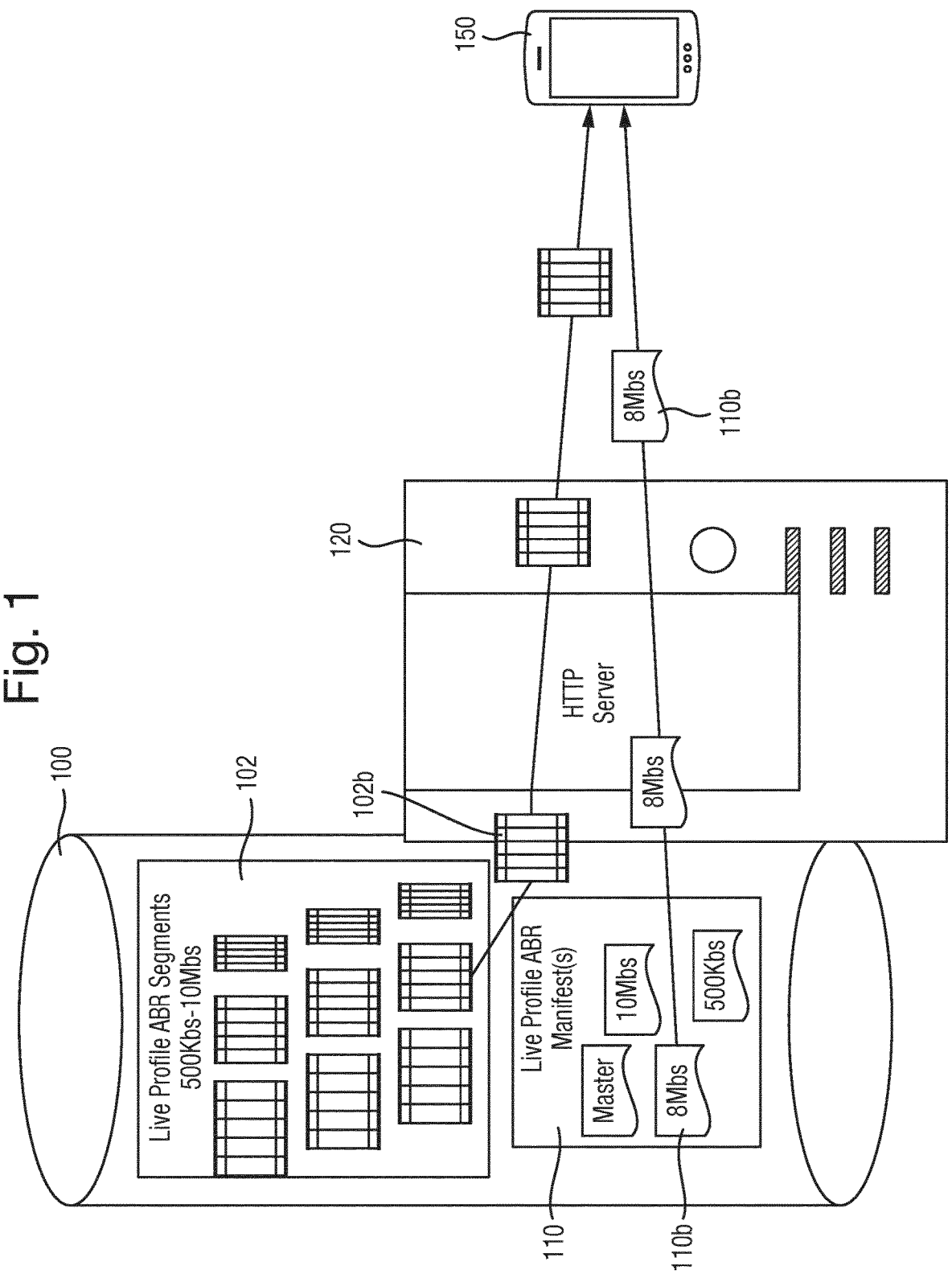
FIG. 1 illustrates a known adaptive bitrate (ABR) streaming system.

FIG. 1 illustrates a known adaptive bitrate (ABR) streaming system. The system comprises an origin server 100, an HTTP server 120, which may or may not be physically co-located with the origin server 100, and a client device 150. The origin server 100 creates a set of segments 102 which are made available to the client device 150 via the http server 120. In order for the client device 150 to know what segments are available, the origin server 100 creates a manifest 110.

In operation, the client device 150 sends a query to the HTTP server 120, the query requesting a particular live content stream. The HTTP server 120 retrieves a manifest file 110b from the origin server 100 and delivers this to the client device. The client device reads the manifest file 110b, identifies the segment it requires and sends a request for this segment to the HTTP server 120. The HTTP server 120 retrieves the requested segment 102b from the origin sever 100 and delivers this to the client device 150. That segment will comprise perhaps 10 seconds of video content. Before that segment of video content stops playing the client device must have received a subsequent segment. To locate the subsequent segment, the client device requires an updated manifest which reflects the newly available segments. The client device 150 polls the HTTP server 120 to download the current manifest. If a poll comes in immediately before the manifest is updated, so the poll just misses the update, then the client device 150 will have to wait until the next poll to receive the new manifest. This results in a significant and variable latency between the availability of new media segments and when the client device 150 is aware of them. This latency can be up to a complete poll interval (typically several seconds). This in turn leads to more difficult buffering and in the presence of congestion or limited bandwidth can lead to client playback stalling or excessively changing bit rates. When the segment sizes are widely variable (for example due to advertisement insertion), the impairments are even more significant.

In practice, the client device may attempt to maintain a buffer of several segments, perhaps three 10 second segments. In that case the client device will be attempting to download the fourth segment while the first one is playing so that it can download the fifth segment while the second one is playing, and so on.

Figure 2:
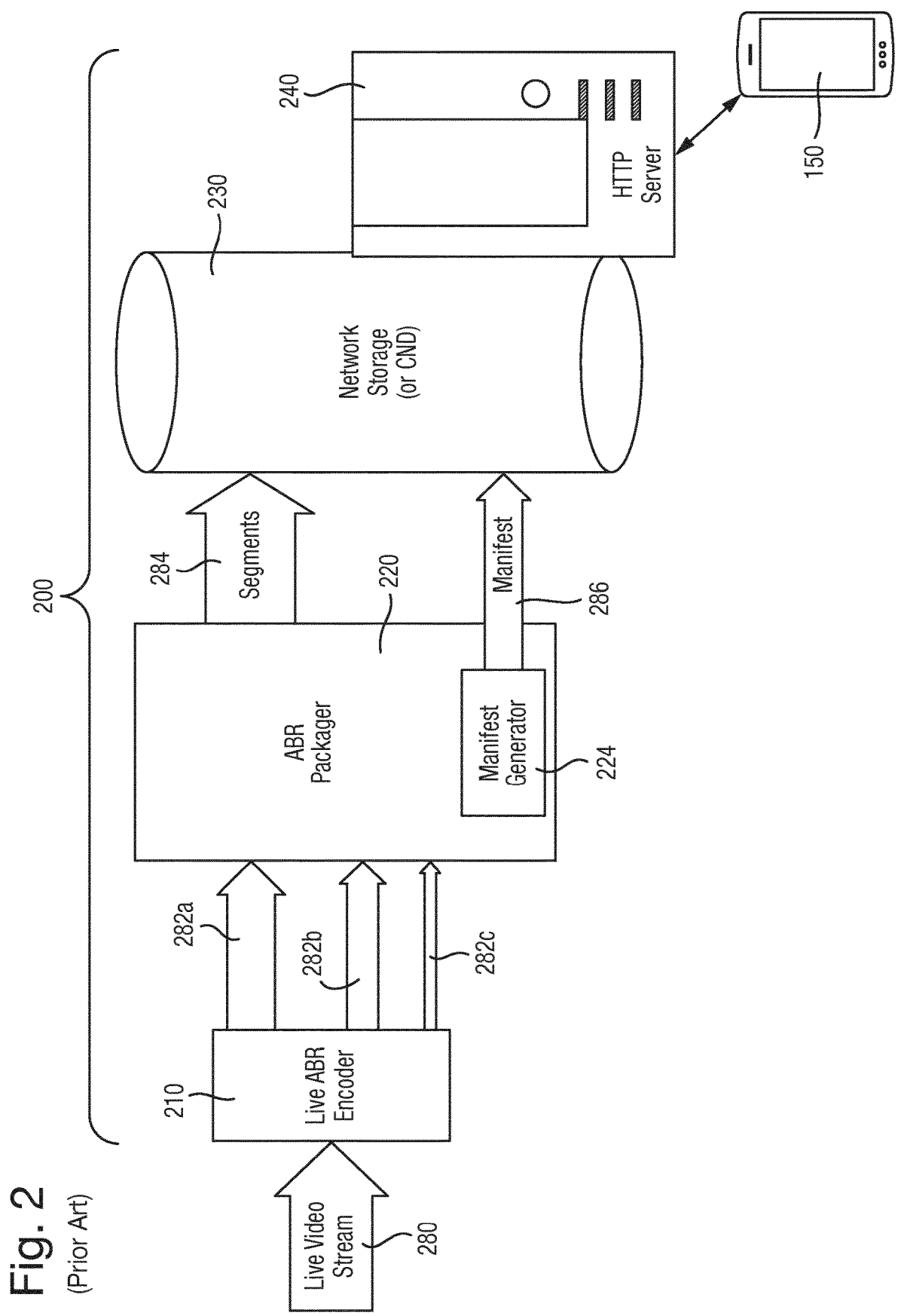
FIG. 2 shows a more detailed view of how the ABR stream is created.

FIG. 2 shows a more detailed view of how the ABR stream is created. Here the component parts of an origin server 200 are shown. It should be noted that in practice these component parts may be distributed across any number of physical machines and even geographical locations. The origin server 200 comprises a live ABR encoder 210, an ABR Packager 220, network storage 230, and an HTTP server 240. The ABR packager 220 comprises a manifest generator 224 which generates and manages the manifest files for the ABR stream.

In operation, a live video stream 280 is received by the Live ABR Encoder 210. The Live ABR Encoder 210 concurrently encodes the video stream at a plurality of different bitrates. The Live ABR Encoder 210 outputs a plurality of encoded video streams 282, each encoded at a different bitrate. The encoded video streams 282 are received at the ABR Packager 220. The ABR Packager 220 splits each video stream 282 into chunks and packets these to generate ABR segments 284 suitable for download by an ABR client in a client device 150. The ABR Packager 220 further comprises a manifest generator 224 which generates the manifest file(s) 286 that describe the segments 284.

Both the manifest files 286 and the segments 284 are stored in a storage component 230, which may be network storage, or a content delivery network (CDN). Finally, an HTTP server 240 allows the server 200 to communicate with at least one client device 150. In such an arrangement, a client device 150 must periodically poll the server 240 to see if a new manifest is available.

In order to address the above described problems, there is provided a system wherein a manifest update hint file is generated. The manifest update hint file provides notification of a future manifest update time based on knowledge provided by an upstream component within the encoder. The encoding process is modified such that a manifest update hint file is output in advance of a new manifest being generated. The manifest update hint file gives a client device an indication of when the manifest will be updated and this allows the client device to request the manifest from the server shortly after the manifest has been updated.

The manifest update hint indicates to the client device when it can expect a manifest update to occur. The client device uses this hint to schedule when it requests an updated manifest file. Operating in this way, the client device is less likely to request a manifest file prematurely; such premature requests are unnecessary signaling overhead. Furthermore, the client device will consistently download an updated manifest file promptly after it is made available, allowing for better buffering and smoother playback of live content received via the streaming service.

For the future update notification, a source transcoder that is acting as the input to the segmenter (and thus providing the real time source of the media segments) feeds advanced notification of when it will be inserting a Boundary Point in the media stream (which is used by the segmenter to divide the stream into segment files). There is usually significant delay in a transcode operation, so it is possible to provide notification several seconds ahead of when the segmenter would have been aware. The segmenter then inserts a future update notification entry into the manifest indicating the clock time when the next update can be expected. This enables a client device to acquire the update in a more precise and timely manner, avoiding the possibility of polling for a manifest just before it is updated (and consequently having to wait for the next polling interval before being aware of the update).

Figure 3B:
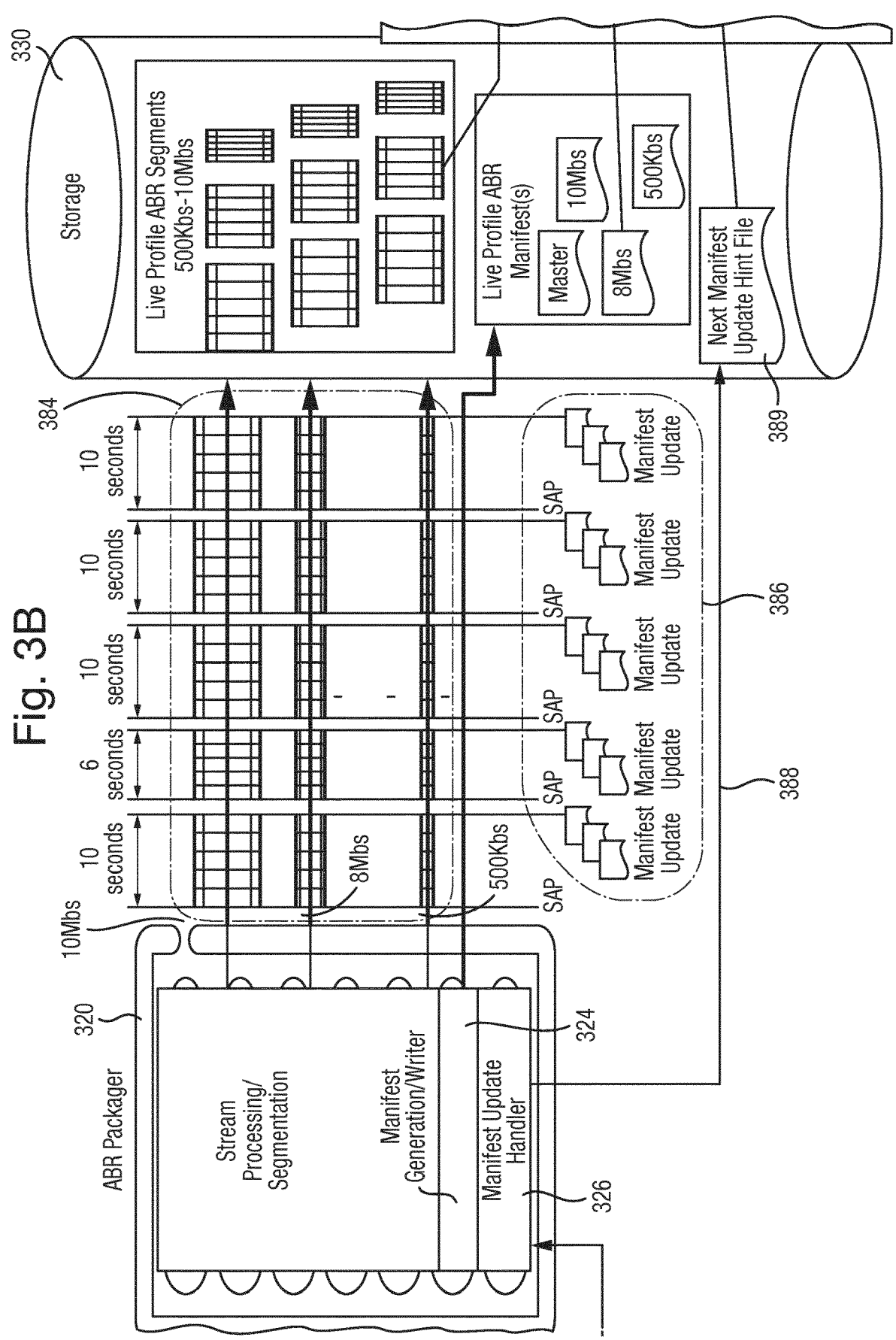
FIG. 3 shows how a manifest hint file is generated within a system that generates ABR streams.

FIG. 3 shows how a manifest hint file is generated within a system that generates ABR streams. Here, the origin server 300 comprises a live ABR encoder 310, an ABR Packager 320, network storage 330, and an HTTP server 340. It should be noted that in practice these component parts may be distributed across any number of physical machines and even geographical locations.

The live ABR encoder 310 comprises a manifest update hint generator 312. The ABR packager 320 comprises a manifest generator 324 and a manifest update handler 326. The manifest update handler 326 generates and manages the manifest files for the ABR stream. The manifest update handler 326 receives signals from the manifest update hint generator 312 and outputs a manifest update hint file 388 to the storage component 330.

In operation, a live video stream 380 is received by the Live ABR Encoder 310. The Live ABR Encoder 310 concurrently encodes the video stream at a plurality of different bitrates. The Live ABR Encoder 310 outputs a plurality of encoded video streams 282, each encoded at a different bitrate. Within the live ABR Encoder 310, the manifest update hint generator 312 generates a hint 381 which is based on the next segment size or an advertisement insertion splice point in the incoming stream.

The encoded video streams 282 are received at the ABR Packager 220. The ABR Packager 220 splits each video stream 282 into chunks and packets these to generate ABR segments 284 suitable for download by an ABR client in a client device 150. The ABR Packager 220 further comprises a manifest generator 224 which generates the manifest file(s) 286 that describe the segments 284.

The ABR Packager 320 also receives the hint 381. The manifest update handler 326 within the ABR packager 320 subscribes to the manifest update hint generator 312 and receives a message 381 as soon as the Live ABR encoder 310 determines the size of the next segment. Due to buffering inside of the Live ABR encoder 310, the Live ABR Encoder 310 has knowledge of the segment size before the segment will be generated.

This knowledge is passed from the live ABR encoder 310 to the ABR Packager 320 in the form of a hint or message 381. The manifest update handler 326 within the ABR Packager 320 updates the next manifest update time in the Next Manifest Update Hint File 389.

The manifest files 386, the segments 384, and the Next Manifest Update Hint File 389 are stored in a storage component 330, which may be network storage, or a content delivery network (CDN). Finally, an HTTP server 340 allows the server 300 to communicate with at least one client device 350. When the client device 350 requests an updated manifest, at the same time it will request the Next Manifest Update Hint file 389 to determine when to send its next request for the subsequent manifest.

There is further provided a client device arranged to receive a live adaptive bitrate stream, the client device further arranged to: request a manifest file; and request a manifest update hint. The client device further arranged to receive a manifest update hint, the manifest update hint including an indication of when the manifest will be updated; and request an updated manifest file at a time indicated by the manifest update hint.

The manifest update hint may be included in a manifest. A manifest file may include an indication of when another, future, manifest file will become available. In such a situation the client device is arranged to receive a live adaptive bitrate stream, and to request a manifest file. The client device is further arranged to read a manifest update hint from the manifest file, the manifest update hint including an indication of when the manifest will be updated; and the client device arranged to request an updated manifest file at a time indicated by the manifest update hint.

The manifest update hint indicates to the client device when it can expect a manifest update to occur. The client device uses this hint to time when it requests an updated manifest file. Operating in this way, the client device is less likely to request a manifest file prematurely; such requests are unnecessary signaling overhead. Furthermore, the client device will consistently download an updated manifest file promptly after it is made available, allowing for better buffering and smoother playback of live content received via the streaming service.

The time indicated by the manifest update hint may be a time interval or specific time mentioned in the manifest update hint, plus a delay. The delay may be selected by the client device.

There may be a systematic delay between the new manifest being created by the server from which the client device receives the live adaptive bitrate stream and it being available for download by the client device. Such a systematic delay may arise due to a shorter segment appearing in the stream. A splice point may occur in the content stream at a point requiring a shorter than usual segment. For example: consider an encoder configured to generate 10 second segments; a splice point notice is received resulting in the encoder generating a shorter segment, such as 4 seconds. The client has been polling at appropriately timed 10 second intervals. The shorter segment means that now the polling has an offset from both the segment generation and when the updated manifest is created.

The manifest update hint described herein allows the client to keep in sync with the segmenter even when segment lengths change.

A splice point may be indicated by an SCTE 35 message. ANSI/SCTE 35 2013 is a joint ANSI/Society of Cable and Telecommunications Engineers standard that describes the inline insertion of cue tones in mpeg transport streams. This is used in broadcasting to insert a local advert or news segment into a nationally broadcast stream.

FIG. 4 illustrates a method in a client device arranged to receive a live adaptive bitrate stream, the method comprising: requesting 420 a manifest file; and requesting a manifest update hint 430. The method further comprises receiving 440 a manifest update hint, the manifest update hint including an indication of when the manifest will be updated; and requesting 470 an updated manifest file at a time indicated (450, 460) by the manifest update hint.

FIG. 4 also shows the client device initiating 410 streaming of the live ABR stream. Further, FIG. 4 gives an example of how the updated manifest file is requested 470 at the time indicated in the manifest update hint file. Here, the client device waits 450 until the time indicated on an internal clock is determined 460 to be the same as the time indicated in the manifest update hint file. Then the client device requests 470 the updated manifest.

The manifest update hint indicates to the client device when it can expect a manifest update to occur. The client device uses this hint to time when it requests an updated manifest file. Operating in this way, the client device is less likely to request a manifest file prematurely; such requests are unnecessary signaling overhead. Furthermore, the client device will consistently download an updated manifest file promptly after it is made available, allowing for better buffering and smoother playback of live content received via the streaming service.

The manifest update hint may be included in a manifest file, and so retrieved by the client device when it retrieves a manifest file, without the need for a separate request.

The time indicated by the manifest update hint may be a time interval or specific time mentioned in the manifest update hint, plus a delay. The method may further comprise selecting the delay.

There may be a systematic delay between the new manifest being created by the server from which the client device receives the live adaptive bitrate stream and it being available for download by the client device.

There is provided a server arranged to deliver a live adaptive bitrate stream, the server arranged to: receive a video stream and generate adaptive bitrate segments for delivery to at least one client device; and calculate the size of a segment being generated before the segment is completed. The server is further arranged to create a manifest update hint file on the basis of the calculated size of the next segment; and send the manifest update hint file in response to a request for such from a client device.

A server that is encoding live content for delivery by adaptive bitrate streaming will determine the size of a segment early on in the encoding of such a segment. The length of the segment determines when it will be ready for download by a client device, and accordingly when the manifest file will be updated to reflect that the segment is ready for download. Accordingly, the server can generate a manifest update hint file in advance of the new manifest file being available, the manifest update hint file giving a useful indication to client devices of when the manifest file will be updated.

The server may be arranged to: receive a request for a manifest file from the client device; and send the current manifest file to the client device.

Subsequent to distributing the manifest update hint file, the server will receive a request for the updated manifest file, that request may be timed by the client device to arrive at the server at a time soon after the manifest file has been updated, that time determined from the indication given in the manifest update hint file. In response to such a request, the server sends the currently available manifest file to the client device.

FIG. 5 illustrates a method of operating a server, the server arranged to deliver a live adaptive bitrate stream, the method comprising: receiving 510 a video stream and generate 520 adaptive bitrate segments for delivery to at least one client device; and calculating 530 the size of a segment being generated before the segment is completed. The method further comprising: creating 540 a manifest update hint file on the basis of the calculated size of the next segment; and sending 550 the manifest update hint file in response to a request for such from a client device.

A server that is encoding live content for delivery by adaptive bitrate streaming will determine the size of a segment early on in the encoding of such a segment. The length of the segment determines when it will be ready for download by a client device, and accordingly when the manifest file will be updated to reflect that the segment is ready for download. Accordingly, the server can generate a manifest update hint file in advance of the new manifest file being available, the manifest update hint file giving a useful indication to client devices of when the manifest file will be updated.

The method may further comprise: receiving a request for a manifest file from the client device; and sending the current manifest file to the client device.

Subsequent to distributing the manifest update hint file, the server will receive a request for the updated manifest file, that request may be timed by the client device to arrive at the server at a time soon after the manifest file has been updated, that time determined from the indication given in the manifest update hint file. In response to such a request, the server sends the currently available manifest file to the client device.

There is provided an encoder arranged to: receive a video stream and generate adaptive bitrate segments for delivery to at least one client; and output the size of a segment being generated once this is determined and before the segment is completed.

A server arranged to deliver a live adaptive bitrate stream may comprise an encoder and a packager. The encoder is arranged to encode the incoming content stream. Due to buffering inside of the encoder, the encoder has knowledge of the segment size before the segment has been generated. Thus, the encoder can issue a notification of how large the next segment will be before that segment is generated. That indication is used to generate a manifest update hint file to indicate to client devices when the manifest file will be updated.

There is provided a method of operating an encoder, the method comprising: receiving a video stream and generate adaptive bitrate segments for delivery to at least one client; and outputting the size of a segment being generated once this is determined and before the segment is completed.

Figure 6:
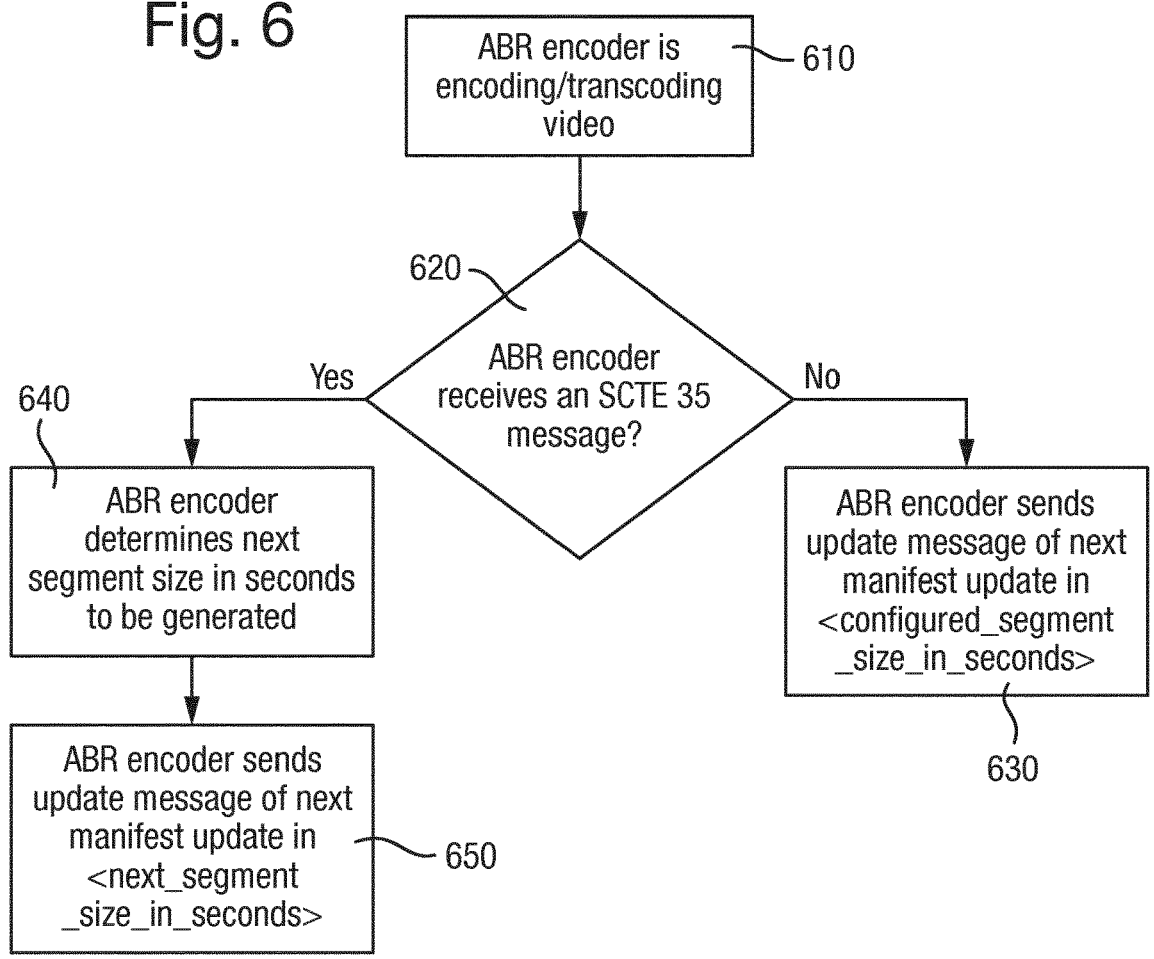
FIG. 6 illustrates the operation of an ABR encoder as described herein.

FIG. 6 illustrates the operation of an ABR encoder as described herein. The ABR encoder encodes 610 video. The encoder makes a determination 620 as to whether it has received an SCTE 35 message. If the encoder has not received an SCTE 35 message, then it sends an update message of the next manifest update message. If the encoder has received an SCTE 35 message, then the ABR encoder calculates 640 the next segment size, in seconds, and sends 650 an update message of the next manifest update message.

There is provided a packager arranged to: receive adaptive bitrate segments from an adaptive bitrate encoder and to package these for delivery; receive an indication of the size of the next segment from the adaptive bitrate encoder; and create a manifest update hint file on the basis of the size of the next segment.

A server arranged to deliver a live adaptive bitrate stream may comprise an encoder and a packager. The packager is responsible for creating downloadable segments from the output of the encoder and for updating the manifest file which lists the available segments. The packager will update the next manifest update time in the Next Manifest Update Hint File in response to the indication of the size of the next segment, that indication received from the encoder. The packager may be an adaptive bitrate packager. The size of the next segment is received at the packager before that next segment.

There is further provided a method of operating a packager, the method comprising: receiving an adaptive bitrate segments from an adaptive bitrate encoder and to package these for delivery; receiving an indication of the size of the next segment from the adaptive bitrate encoder; and creating a manifest update hint file on the basis of the size of the next segment. The size of the next segment is received at the packager before that next segment.

Figure 7:
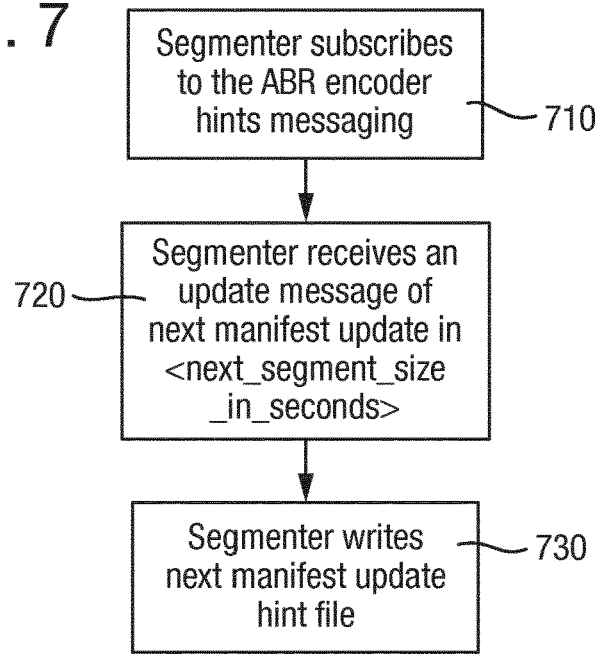
FIG. 7 illustrates the operation of an ABR packager presented herein.

FIG. 7 illustrates the operation of an ABR packager presented herein. The ABR Packager subscribes 710 to the hint messages issued by the ABR Encoder. When the ABR Packager receives 720 an update message from the ABR encoder, the Packager writes 730 a new next manifest update hint file.

Figure 8:
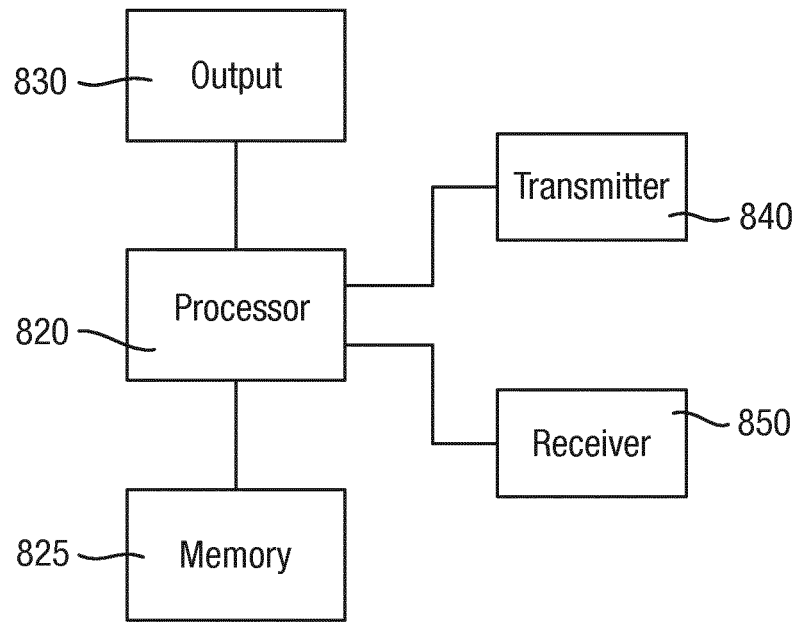
FIG. 8 illustrates an apparatus for receiving a live adaptive bitrate stream.

FIG. 8 illustrates an apparatus for receiving a live adaptive bitrate stream. The apparatus comprises a processor 820 and a memory 825, said memory containing instructions executable by said processor whereby said apparatus is operative to receive a manifest of segments of which the live adaptive bitrate stream is comprised. The apparatus is further operative to request a manifest file; and request a manifest update hint. The apparatus is further operative to receive a manifest update hint, the manifest update hint including an indication of when the manifest will be updated; and request an updated manifest file at a time indicated by the manifest update hint.

The apparatus of FIG. 8 further comprises an output 830 for outputting content to a user. The output 830 may comprise, for example, a screen, a speaker, a headphone socket, or an HDMI port. The apparatus further comprises a transmitter 840 for sending information into a network, and a receiver 850 for receiving information from a network. Transmitter 840 and receiver 850 may use either wired or wireless communication protocols.

Figure 9:
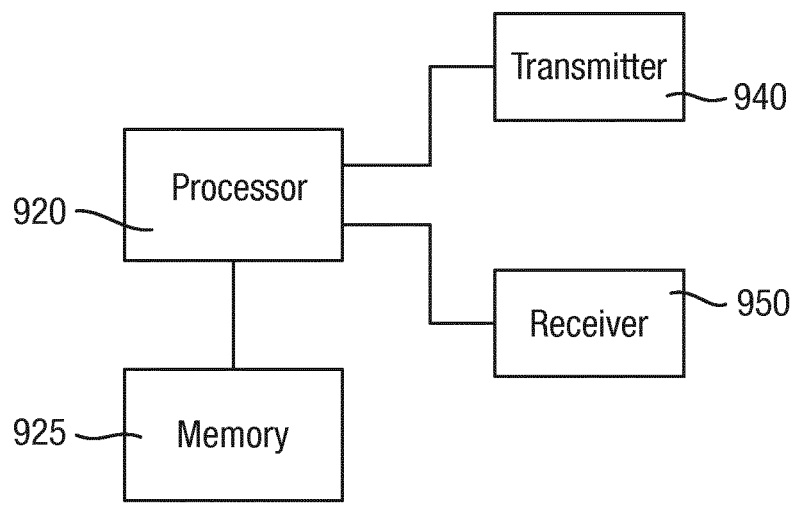
FIG. 9 illustrates an apparatus for delivering a live adaptive bitrate stream.

FIG. 9 illustrates an apparatus for delivering a live adaptive bitrate stream. The apparatus comprises a processor 920 and a memory 925, said memory containing instructions executable by said processor 920 whereby said apparatus is operative to: receive a video stream and generate adaptive bitrate segments for delivery to at least one client device; and calculate the size of a segment being generated before the segment is completed. The apparatus is further operative to create a manifest update hint file on the basis of the size of the next segment; and send the manifest update hint file in response to a request for such from a client device.

The apparatus of FIG. 9 further comprises a transmitter 940 for sending information into a network, and a receiver 950 for receiving information from a network. Transmitter 940 and receiver 950 may use either wired or wireless communication protocols.

There is further provided an apparatus for receiving a live adaptive bitrate stream comprising a processor and a memory, said memory containing instructions executable by said processor whereby said apparatus comprising: a module for requesting a manifest file; and a module for requesting a manifest update hint. The apparatus further comprises a module for receiving a manifest update hint, the manifest update hint including an indication of when the manifest will be updated; and a module for requesting an updated manifest file at a time indicated by the manifest update hint.

The time indicated by the manifest update hint may be a time interval or specific time mentioned in the manifest update hint, plus a delay. The delay may be selected by the client device. The live adaptive bitrate stream contains live content.

There is further provided an apparatus for delivering a live adaptive bitrate stream comprising a processor and a memory, said memory containing instructions executable by said processor whereby said apparatus comprising: a module for receiving a video stream and generate adaptive bitrate segments for delivery to at least one client device; and a module for calculating the size of a segment being generated before the segment is completed. The apparatus further comprises a module for creating a manifest update hint file on the basis of the size of the next segment; and a module for sending the manifest update hint file in response to a request for such from a client device.

There is further provided a computer-readable medium, carrying instructions, which, when executed by computer logic, causes said computer logic to carry out any of the methods defined herein.

The live adaptive bitrate stream contains live content. Live content is content that is received at the streaming system shortly before being sent to clients, any delay resulting from the time taken to process incoming data into a form ready for live adaptive bitrate streaming. The live adaptive bitrate stream may comprise video content.

It will be apparent to the skilled person that the exact order and content of the actions carried out in the method described herein may be altered according to the requirements of a particular set of execution parameters. Accordingly, the order in which actions are described and/or claimed is not to be construed as a strict limitation on order in which actions are to be performed.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope The client device may be a user apparatus. The client device may be any kind of personal computer such as a television, a smart television, a set-top box, a games-console, a home-theatre personal computer, a tablet, a smartphone, a laptop, or even a desktop PC.

While examples have been given in the context of HTTP Adaptive Streaming, these examples are not intended to be the limit of streaming system to which the disclosed method and apparatus may be applied. The principles disclosed herein can be applied to any streaming system which uses a description file. For example, this method and apparatus may be applied to Apple™ HTTP Live Streaming, and Microsoft™ Smooth Streaming.

The invention claimed is:

1. An apparatus configured for receiving a live adaptive bitrate stream, comprising:
   a processor; and
   a memory containing instructions executable by the processor whereby the apparatus is operative to:
      receive a manifest file associated with the live adaptive bitrate stream;
      receive a manifest update hint, the manifest update hint including an indication of a time when the manifest file will be updated; and
      send a request for an updated manifest file, where the apparatus determines a timing of the request using the time indicated by the manifest update hint.

2. The apparatus of claim 1, wherein the time indicated by the manifest update hint is a time interval or specific time indicated in the manifest update hint, plus a delay.

3. The apparatus of claim 1, wherein the apparatus determines the timing of the request so that the request arrives at the server subsequent to the updated manifest file becoming available at the server.

4. The apparatus of claim 1, wherein the live adaptive bitrate stream contains live content.

5. The apparatus of claim 1, wherein the apparatus is a client device.

6. An apparatus configured for delivering a live adaptive bitrate stream, comprising:
   a processor; and
   a memory containing instructions executable by the processor whereby the apparatus is operative to:
      receive a video stream and generate adaptive bitrate segments comprising the live adaptive bitrate stream for delivery to a client device and update a manifest file responsive to completing generation of each next adaptive bitrate segment of the live adaptive bitrate stream; and
      with respect to the generation of each next adaptive bitrate segment of the live adaptive bitrate stream:
         calculate the size of the next adaptive bitrate segment, before the generation of the next adaptive bitrate segment is completed;
         determine a time when the manifest file will be updated to reflect availability of the next adaptive bitrate segment, based on the calculated size;
         create a manifest update hint indicating the determined time; and
         send the manifest update hinter in response to a request from the client device for the next adaptive bitrate segment.

7. The apparatus of claim 6, wherein the instructions cause the apparatus to:
   receive a request for the manifest file from the client device, wherein, in dependence on the manifest update hint sent to the client device, the client times the request so that the apparatus receives the request subsequent to updating the manifest file responsive to completing the generation of the next adaptive bitrate segment; and
   send the updated manifest file to the client device.

8. The apparatus of claim 6, wherein the apparatus is a server.

* * * * *